J. W. Smith,
Corn Harvester.

No. 43,716.  Patented Aug. 2, 1864.

Witnesses
R. T. Campbell
O. Schafer

Inventor
John W. Smith

UNITED STATES PATENT OFFICE.

JOHN W. SMITH, OF IOWA POINT, KANSAS.

IMPROVEMENT IN CORN-HARVESTERS.

Specification forming part of Letters Patent No. 43,716, dated August 2, 1864.

*To all whom it may concern:*

Be it known that I, JOHN W. SMITH, of Iowa Point, Doniphan county, State of Kansas, have invented a new and Improved Corn and Stubble Harvester; and I do hereby declare that the following is a full, clear, and exact description thereof, reference being had to the accompanying drawings, making a part of this specification, in which—

Figure 1:
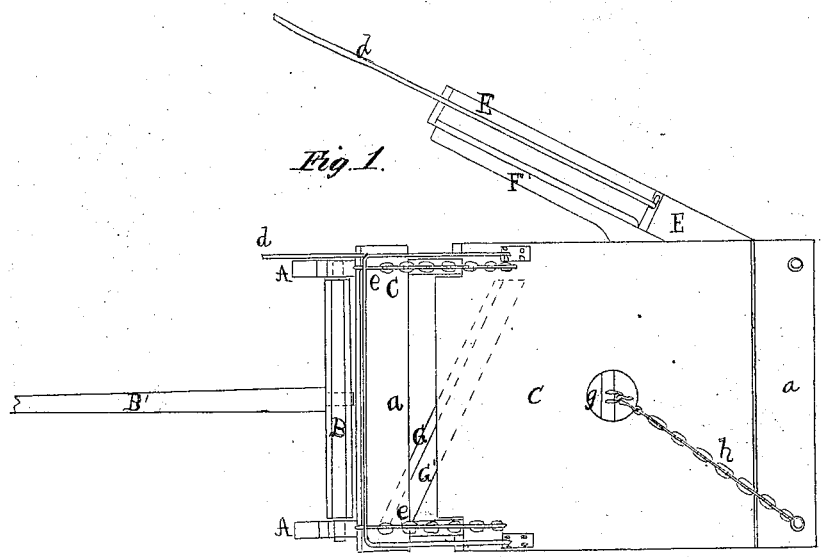
Figure 2:
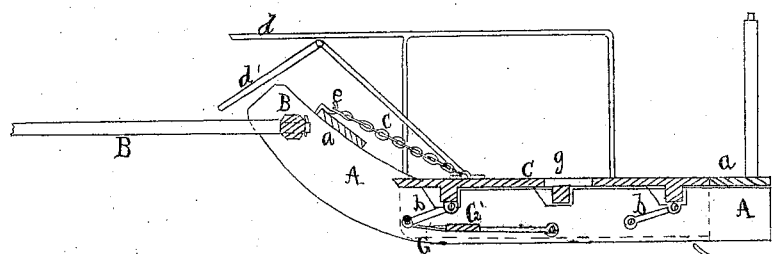
Figure 3:
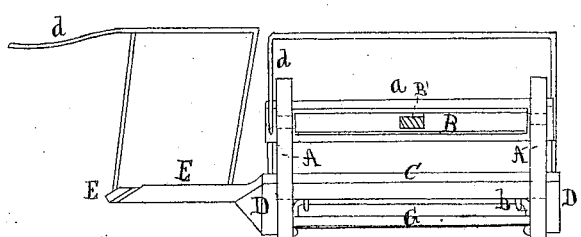
Figure 4:
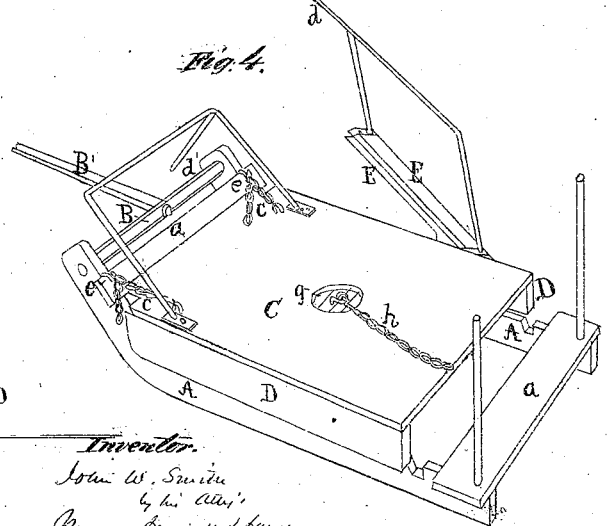

Figure 1 is a plan view of my improved harvester. Fig. 2 is a longitudinal section, taken in a vertical plane, through the center of the machine. Fig. 3 is a front end elevation, and Fig. 4 is a perspective view of the machine complete and ready for use.

Similar letters of reference indicate corresponding parts in the several figures.

The object of this invention is to so apply the stalk-cutter to a vertically-adjustable platform that both can be readily adjusted and securely held in position at any desired distance from the ground according to the condition of the standing crop, as will be hereinafter described.

Another object of my invention is to so construct a machine for harvesting corn and cane stalks that it will also cut the stubble and leave the ground in a good condition for plowing, as will be hereinafter described.

To enable others skilled in the art to make and use my invention, I will describe its construction and operation.

In the accompanying drawings, A A represent two sled-runners, which are secured together at suitable distances apart by means of forward and rear transverse beams, *a a*, and which are provided at their forward elevated ends with a rocking beam, B, to which the draft-pole B′ is secured. To such a sled I apply an adjustable platform, C, which is provided with side pieces, D D, which overhang the runners A and serve as guides for the platform, and also end supports for the transverse stiffening-beams thereof. This platform is connected to the two sled-runners A A by means of jointed arms *b b*, which admit of its being elevated or depressed without disconnecting it from the runners, and to each side of the forward end of said platform chains *c c* are attached, which, on being connected to hooks *e e*, will keep the platform in an elevated position. When the platform is at its lowest point it rests directly upon the top edges of the sled-runners A, as shown in Fig. 2.

Projecting at an acute angle from the left-hand side of the platform C is a beam, E, to which a knife, E′, is secured. While the cutting-edge of this knife forms an acute angle with one side of the platform, this edge is also inclined backward, so as to sever the stalks as they are gathered in to it with an oblique drawing-cut.

A light frame-work is erected on the cutter-beam E, having a curved rod projecting from its forward end, as indicated by *d*, Figs. 1, 2. This rod or arm *d* is intended for gathering in the inclined stalks to the cutter E′ as the machine is dragged through the field, and on the opposite side of the space between the forward end of the knife E′ and the corresponding end of the sled another arm, *d′*, projects forward and downward, and performs a similar office to that described for arm *d*.

Between the two sled-runners A A, and near their forward ends, a knife, G, is arranged in a direction obliquely to the track of the team, as shown in Fig. 1. This knife-blade G is suitably secured to a beam, G′, and both are connected at their ends to the runners A A at a point as near the base of the machine as possible. This knife G, it will be seen, is across the track of the team, and partially beneath the platform C, so that as the machine is drawn along and the knife E′ is cutting and delivering the stalks of corn upon the platform C, the knife G will cut the stubble closely to the surface of the ground and leave the latter in a good condition for plowing. While this is the case, it will also be seen that the knife G is arranged at an opposite angle to the knife E′, and therefore the side draft on the machine will be to a great extent obviated by the counteracting influence of the stubble-knife.

An opening, *g*, is made through the platform C, and a staple secured to the transverse beam just below this opening. To this staple a chain, *h*, is hooked, which is intended for binding the cut grain and setting the shocks up on an end out of the way of the machine during its next round.

From this description it will be seen that as the machine is dragged through the field the fenders *a a′* will gather in the cornstalks to the knife E, which cuts them and allows them to be thrown down on the adjustable platform C over a chain, h. This operation proceeds until a sufficient quantity to make in a shock has been cut, when a person, who may stand on the rear part of the sled, carries chain h over the stalks and bundles or shocks them, after which they are deposited on the ground. During this operation the stubble-knife between the sled-runners is at work cutting off the stubble and preventing side draft on the machine, which would be occasioned by the side knife, E', were this stubble-knife not arranged at an opposite angle to the stalk-knife. The adjustable platform having the stalk-cutter applied to it enables me to adjust the knife as may be required, and to always keep the surface of the platform and the edge of this knife in the same relation to each other.

Having thus described my invention, what I claim as new, and desire to secure by Letters Patent, is—

1. The application of a vertically-adjustable platform to the sled-runners A of a corn-harvester having the stalk cutter applied to said platform, substantially as hereinafter described.

2. A corn-harvester which has an adjustable platform carrying a stalk-cutter, in combination with a stubble-cutter arranged on one side of the stalk-cutter and operating simultaneously therewith, substantially as described.

3. The combination of two knives in a cornstalk and stubble-cutting machine, when these knives are arranged at right angles or at opposite angles to each other, or in such manner that the stubble-cutter will counteract the side draft on the stalk-cutter, substantially as described.

4. The use of side guides, D D, in combination with a platform which is vertically adjustable on its carriage A A, substantially as described.

Witness my hand in the matter of my application for a patent.

JOHN W. SMITH.

Witnesses:
J. L. RICE,
SAM. M. CLARK.